United States Patent [19]
Torii et al.

[11] Patent Number: 4,782,713
[45] Date of Patent: Nov. 8, 1988

[54] INDUSTRIAL ROBOT SHAFT SUPPORTING MECHANISM

[75] Inventors: Nobutoshi Torii, Hachioji; Ryo Nihei, Musashino, both of Japan

[73] Assignee: Fanuc Ltd, Minamitsuru, Japan

[21] Appl. No.: 50,301

[22] PCT Filed: Sep. 10, 1986

[86] PCT No.: PCT/JP86/00462

§ 371 Date: Jun. 11, 1987

§ 102(e) Date: Jun. 11, 1987

[87] PCT Pub. No.: WO87/01327

PCT Pub. Date: Mar. 12, 1987

[30] Foreign Application Priority Data

Sep. 10, 1985 [JP] Japan .................. 60-20025

[51] Int. Cl.⁴ .............. F16H 25/24; B25J 11/00; F16C 29/02
[52] U.S. Cl. ................ 74/89.15; 248/285; 248/295.1; 384/42; 414/590; 901/17; 901/27
[58] Field of Search ......... 74/89.15; 248/295.1, 248/279, 285, 296, 297.2, 669; 901/16, 17, 27, 28; 384/26, 42; 414/589, 590

[56] References Cited

U.S. PATENT DOCUMENTS

| | | | |
|---|---|---|---|
| 3,709,379 | 1/1973 | Kaufeldt | 901/16 X |
| 3,805,629 | 1/1974 | Martin | 74/89.15 |
| 4,130,205 | 12/1978 | Luthi | 214/1 BB |
| 4,534,006 | 8/1985 | Minucciani et al. | 901/16 X |
| 4,566,738 | 1/1986 | Fasth | 384/42 X |
| 4,571,149 | 2/1986 | Soroka et al. | 401/16 X |

FOREIGN PATENT DOCUMENTS

| | | |
|---|---|---|
| EP0106826 | 4/1984 | European Pat. Off. . |
| EP0122146 | 10/1984 | European Pat. Off. . |
| DE3326962 | 2/1985 | Fed. Rep. of Germany . |
| 2334467 | 7/1977 | France . |
| 60-17977 | 2/1985 | Japan . |
| 60-71191 | 4/1985 | Japan . |

OTHER PUBLICATIONS

European Search Report, 9/2/88.
Annex to European Search Report.

*Primary Examiner*—Allan D. Herrmann
*Attorney, Agent, or Firm*—Staas & Halsey

[57] ABSTRACT

A shaft supporting mechanism of an industrial robot in which an arm is supported by a freely extendable support shaft inside a hollow post and a working plane of a working arm is variably set is provided, with plural sets of linear support guides in opposed relation about a drive mechanism of the support shaft. As a result, the support shaft is held in the post stably and balanced in the vertical direction even if an external force attempting to tilt the support shaft is applied during up-and-down movement of the support shaft or operation of the working arm.

3 Claims, 3 Drawing Sheets

FIG. I

INDUSTRIAL ROBOT SHAFT SUPPORTING MECHANISM

DESCRIPTION

Background of the Invention

This invention relates to an industrial robot mechanism for supporting, internally of a post, a shaft supporting an arm in a freely extendable manner.

A variety of industrial robots have recently come into wide use in various fields. FIG. 3 is a side view illustrating one example of a horizontal articulated industrial robot installed on a floor and provided with a swiveling post.

In FIG. 3, numeral 1 denotes a post supported on a base 2 and capable of being swiveled within a predetermined rotational range ($\theta$). Provided within the base 2 is a swiveling mechanism 21 for swiveling the post 1. Numeral 3 denotes a first arm (working arm) supported at the upper portion of the post 1 by a support shaft 4. A second arm 5 capable of being swiveled in the horizontal direction is attached to the distal end of the first arm 3, and the distal end of the second arm 5 is provided with a wrist 51.

Provided in the post 1 is a drive mechanism 11 (FIG. 4) for moving the support shaft 4 up and down within a predetermined range (Z) to control the height of the first arm 3. Though the details are not shown, the drive mechanism 11 drives the support shaft 4 up and down by e.g. a rack-and-pinion combination or a screw rod-nut combination, thereby controlling the height of the first 3 (working arm). A guide for linear support is provided between the support shaft 4 and the inner wall of the post 1 so that the support shaft 4 will move linearly with respect to the post 1 when it is driven up and down by the drive mechanism 11.

FIG. 4 is a sectional view taken along line 4—4 of FIG. 3 and illustrating an example of the drive mechanism 11. The support shaft 4, which is driven by the drive mechanism 11, consisting of a combination of a screw rod 6 and nut 41, possesses a sliding contact portion 42 at which the support shaft 4 slides on the side faces of a linear support guide 14 provided on a supporting plate 13, thereby forming a guide mechanism. The arrangement is such that the support shaft 4 moves in the vertical direction.

In the above-described shaft supporting mechanism of support shaft 4, the shaft 4 moves linearly while the sliding contact portion 42 thereof is in contact with three faces of the linear support guide 14, and the working plane of the first arm 3 moves up and down in parallel with the longitudinal direction of the post 1. However, the guide 14 and sliding contact portion 42 tend to separate from each other in response to a force acting in the direction of the arrow X shown in FIG. 4. For example, if the reaction force of a load acting upon the second arm 5 is in the direction of the arrow X, the support shaft 4 will no longer be supported stably.

SUMMARY OF THE INVENTION

The present invention has been devised in view of the foregoing problems of the prior art and its object is to provide an industrial robot shaft supporting mechanism capable of supporting the shaft of a working arm and of moving the shaft linearly in the vertical direction while maintaining a stable balance.

In accordance with the present invention, there is provided an industrial robot shaft supporting mechanism for supporting an arm in a freely extendable manner inside a hollow post and for variably setting a working plane of the arm. The mechanism includes: a drive mechanism for driving the support shaft to extend and retract the same; a plurality of guide seats arranged at positions symmetrical which respect to the drive mechanism and each having an opening, and linear support guides engaging the guide seats and attached to opposing inner wall portions of the post.

In accordance with the industrial robot shaft supporting mechanism of the invention, a plurality of linear support guide mechanisms are provided to oppose one another with the drive mechanism at the center. As a result, the support shaft is held in the post stably and balanced in the vertical direction even if an external force attempting to tilt the support shaft is applied during up-and-down movement of the support shaft or operation of the working arm. Furthermore, the linear support guides also function as post reinforcing members at the inner wall portion of the post.

DETAILED DESCRIPTION OF THE PREFERRED EMBODIMENTS

Embodiments of the present invention will now be described with reference to the drawings.

Figure 1:
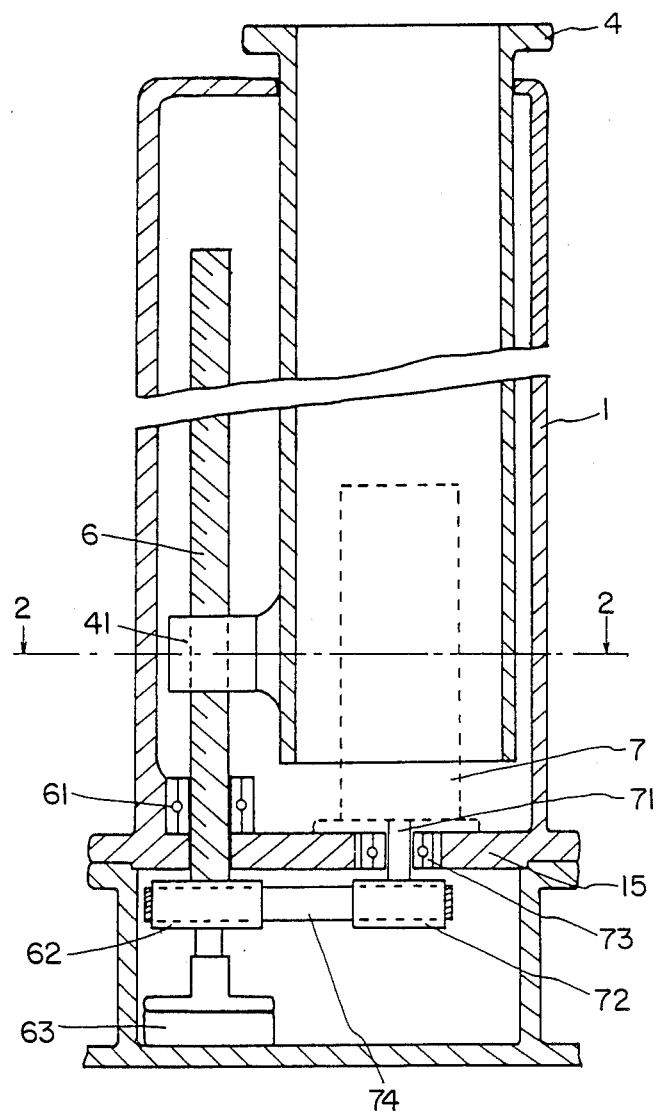
FIG. 1 is a longitudinal sectional view illustrating an embodiment of an industrial robot shaft supporting mechanism according to the present invention.
Figure 2:
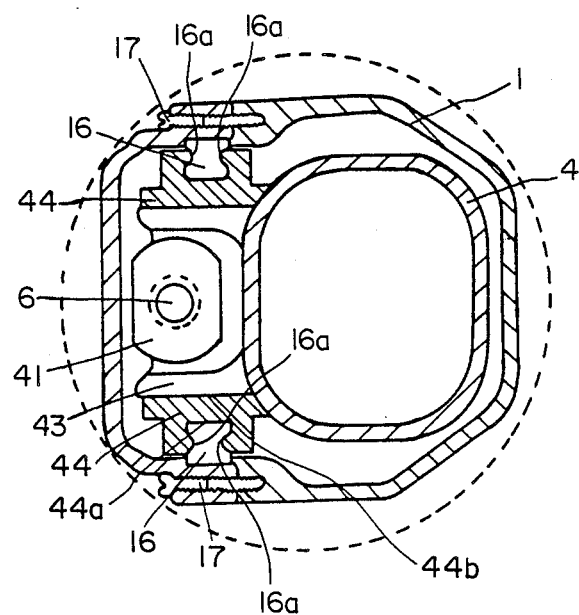
FIG. 2 is a transverse sectional view taken along line 2—2 of FIG. 1
Figure 3:
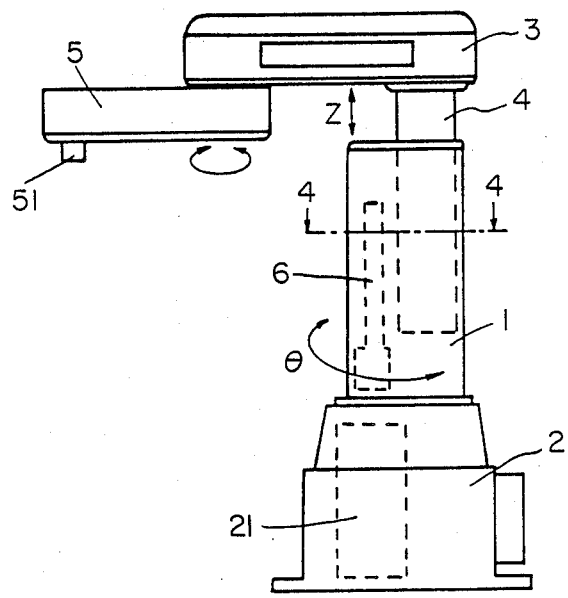
FIG. 3 is a side view illustrating an example of a conventional horizontal articulated-type industrial robot.
Figure 4:
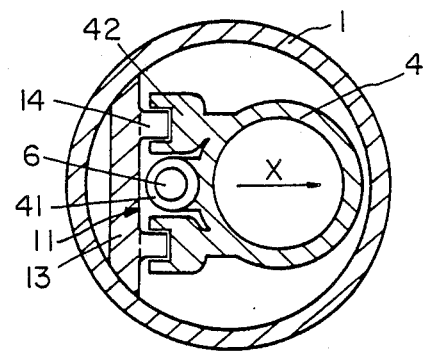
FIG. 4 is a sectional view, taken along line 4—4 of FIG. 3, illustrating an example of a conventional shaft supporting mechanism.

In FIGS. 1 and 2, portions similar to those shown in FIGS. 3 and 4 are designated by like reference characters and a description thereof is omitted. Numeral 7 denotes a drive motor for supplying a driving force that drives the support shaft 4 up and down by the drive mechanism composed of the combination of the screw rod 6 and nut 41. Fitted on a shaft 71 of the drive motor 7 is a motor pulley 72, which is attached to a partitioning wall 15 of post 1 via a bearing 73.

The screw rod 6 is attached to the partitioning wall 15 via a bearing 61 and is freely rotatable so as to be rotated by driving a belt 74 stretched between a drive pulley 62 provided on the screw shaft 6 and the motor pulley 72. The lower end portion of the screw rod 6 is provided with a brake mechanism 63 actuated by electromagnetic action to stop the screw rod 6 from rotating.

The nut 41, which is threadedly engaged with the screw rod 6, is attached to a nut holder 43 provided on the support shaft 4, as shown in FIG. 2. Two guide seats 44 are attached to both side faces of the nut holder 43. The guide seats 44, each of which has an opening 44a and a back face 44b, are attached to the nut holder with their openings 44a facing outward and their back faces 44b facing each other about the screw rod 6 as center.

Guide rails 16, serving as linear support guides, each have a groove 16a in two opposite side faces thereof, each guide rail therefore having a cross section similar to that of a railroad rail. The arrangement is such that the opening 44a of each guide seat 44 is engaged with the grooves of the corresponding guide rail 16, so that the guide seat 44 may be moved linearly along the guide rail 16. Each guide seat 44 engages with the corresponding guide rail 16 and slides smoothly on the side surface of the guide rail 44. The guide rails 16 are attached in opposing relation to the inner wall of the hollow, cylindrically shaped post 1, and the support shaft 4, which has the nut holder 43 whose two sides are provided with the guide seats 44 engaged with the guide rails 16, is arranged within the post 1.

Accordingly, the support shaft 4 moves linearly up and down, while being guided by the guide seats 44 having the respective openings 44a engaged with the guide rails 16, along these guide rails 16 attached in opposing relation to the inner wall of the post 1 in such a manner that the rigidity of the post 1 is increased. In the present embodiment, the post 1 can be separated into two halves longitudinally by removing locking bolts 17, thus making it possible to install components within the post 1 and to adjust them.

The operation of the present embodiment constructed as set forth above will now be described. When current is passed through the drive motor 7 to rotate the same, the motor pulley 72 rotates, thereby rotating the drive pulley 62 via the belt 74 to turn the screw rod 6.

Owing to rotation of the screw rod 6, the support shaft 4 provided with the nut 41 threadedly engaged with the screw rod 6 is acted upon by a force that moves the support shaft up or down, and the guide seats 44 travel linearly longitudinally of the post 1 under the guidance of the guide rails 16. Since the guide seats 44 and guide rails 16 flanking the screw rod 6 are provided at positions symmetrical with respect to the nut holder 43, the up-and-down movement of the support shaft 4 is balanced and stable.

Since the guide rails 16 are provided in opposed relation on the inner wall of the post 1 having the hollow, cylindrical structure in the present embodiment, the post 1 is provided with additional rigidity.

In the shaft support mechanism of the present invention as described in detail hereinabove, plural sets of linear support guide rails 16 and guide seats 44 are provided in opposing relation about a drive mechanism for up-and-down movement and serve as a mechanism for supporting a shaft 4, which moves the working arm 3 of an industrial robot vertically up and down. As a result, vertical support of the support shaft is achieved stably with excellent balance even if an external force attempting to tilt the support shaft 4 is applied during up-and-down movement of the support shaft 4 or operation of the working arm 3.

Further, the guide mechanism has left-right symmetry with respect to the screw rod 6 for drive. This has the advantage of simplifying the arrangement inside the post 1. In addition, the provision of the guide rails 16 on the inner wall of the post 1 raises the rigidity of the post 1 and makes it possible to obtain a more compact arrangement.

Though the present invention has been described based on the above-described embodiments, the invention can be modified in various ways without departing from the scope of the claims.

By applying the invention to an industrial robot in which an arm is supported by a freely extendable support shaft inside a hollow post and the working plane of the arm is variably set, vertical support of the support shaft can be achieved stably with excellent balance even if an external force attempting to tilt the support shaft is applied during up-and-down movement of the support shaft or operation of the working arm.

We claim:

1. A shaft supporting mechanism of an industrial robot in which an arm is supported by a freely extendable support shaft inside a hollow post and a working plane of the arm is variably set, comprising:
   (a) a drive mechanism positioned outside said support shaft for driving said support shaft to extend and retract the same vertically;
   (b) a plurality of guide seats connected to said support shaft, arranged at positions substantially laterally symmetrical with respect to said drive mechanism and each having an opening; and
   (c) a corresponding plurality of linear support guides engaging said guide seats and being attached to opposing inner wall portions of said post.

2. A shaft supporting mechanism of an industrial robot according to claim 1, wherein said linear support guides are adapted in such a manner that said guide seats engage grooves in two, opposing side surfaces thereof.

3. A shaft supporting mechanism of an industrial robot in which an arm is supported by a freely extendable support shaft inside a hollow post and a working plane of the arm is variably set, comprising:
   (a) a drive mechanism for driving said support shaft to extend and retract the same;
   (b) a plurality of guide seats connected to said support shaft arranged at positions symmetrical with respect to said drive mechanism and each having an opening; and
   (c) linear support guides engaging said guide seats and attached to opposing inner wall portions of said post,
   wherein said post is so adapted as to be separable into a portion to which said linear support guides are attached and a portion other than said portion.

* * * * *

UNITED STATES PATENT AND TRADEMARK OFFICE
CERTIFICATE OF CORRECTION

PATENT NO. : 4,782,713

DATED : Nov. 8, 1988

INVENTOR(S) : Torii et al.

It is certified that error appears in the above-identified patent and that said Letters Patent is hereby corrected as shown below:

FRONT PAGE

[56] U.S. PATENT DOCUMENTS

"Under 3,805,629"
   delete "1/1974" and insert --4/1974--;
"Under 4,571,149"
   delete "401/16X" and insert --901/16X--.

Signed and Sealed this

Fourteenth Day of March, 1989

Attest:

DONALD J. QUIGG

*Attesting Officer*  *Commissioner of Patents and Trademarks*